US006364329B1

(12) United States Patent
Holub et al.

(10) Patent No.: US 6,364,329 B1
(45) Date of Patent: Apr. 2, 2002

(54) COOLER WITH BEVERAGE DISPENSER

(75) Inventors: Timothy M. Holub, Cheney; Gary P. Israel, Andover; Lauren D. Worley, Wichita, all of KS (US); Vernon M. Svitak, Jr., Scottsdale, AZ (US); Dowling G. Bellows, Valley Center, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/370,300

(22) Filed: Aug. 9, 1999

(51) Int. Cl.[7] .................................................. B62B 1/00
(52) U.S. Cl. ..................................... 280/47.26; 280/655
(58) Field of Search ........................... 280/47.34, 47.35, 280/47.26, 47.24, 79.11, 79.2, 656, 79.3, 655; 62/457.1, 389; 206/223

(56) References Cited

U.S. PATENT DOCUMENTS

| | | | | | |
|---|---|---|---|---|---|
| 3,914,957 | A | * | 10/1975 | Jacobs | 62/338 |
| 4,162,029 | A | | 7/1979 | Gottsegen et al. | 222/131 |
| 4,164,853 | A | * | 8/1979 | McDonough | 62/457 |
| 4,249,392 | A | | 2/1981 | Hotta | |
| 4,577,475 | A | | 3/1986 | Herrera | |
| 5,222,631 | A | * | 6/1993 | Hood | 222/131 |
| 5,407,218 | A | * | 4/1995 | Jackson | 280/47.34 |
| 5,626,353 | A | * | 5/1997 | Campbell | 280/47.35 |
| 5,730,282 | A | * | 3/1998 | Bureau | 208/223 |
| 5,803,472 | A | * | 9/1998 | Lien | 280/47.26 |
| 5,860,281 | A | | 1/1999 | Coffee et al. | |
| 6,109,059 | A | * | 8/2000 | Lebrun | 62/451.5 |
| 6,131,925 | A | * | 10/2000 | Weldon | 280/47.26 |

FOREIGN PATENT DOCUMENTS

| | | | |
|---|---|---|---|
| EP | 0 56775 | A | 7/1982 |

OTHER PUBLICATIONS

PCT International Search Report Dated Jun. 14, 2001.

* cited by examiner

*Primary Examiner*—Richard M. Camby
(74) *Attorney, Agent, or Firm*—Kramer Levin Naftalis & Frankel LLP

(57) ABSTRACT

A cooler having a beverage dispenser adapted for seating within the cooler. The beverage dispenser is removably arranged in the cooler, either within the main interior compartment of the cooler or in its own compartment and includes a manually operated pump assembly with a rotatable dispensing arm. The cooler may have a one-piece lid or a split lid, with one portion of the split lid covering the main compartment and another portion covering the beverage dispenser. The cooler may also have wheels and a pull handle. The lid may be attached to the cooler with an integral hinge which limits the angle through which the lid may be opened.

28 Claims, 9 Drawing Sheets

COOLER WITH BEVERAGE DISPENSER

FIELD OF THE INVENTION

The present application relates to coolers.

BACKGROUND INFORMATION

Conventional coolers typically comprise one cooling compartment for holding perishable items in thermal isolation from surrounding conditions. Beverages are usually stored in their own containers along with other items in the cooling compartment. To dispense a beverage, a user typically opens the cooler lid, removes a beverage container and pours the contents of the container. If the beverage container is reusable, the user may replace the container in the cooling compartment. To do so, the user will either keep the cooler lid open throughout the dispensing process, or close and reopen the lid to replace the beverage container. Putting the reusable container beverage container back into the cooling compartment may be difficult and time consuming if other items in the compartment have shifted into the cavity created by the removal of the beverage container. While the lid is open, the contents of the cooling compartment are exposed to the ambient conditions, thereby compromising the thermal isolation function of the cooler.

A cooler marketed by the Igloo Products Corporation of Tulsa, Okla. provides for a beverage dispenser which dispenses a beverage by gravity through a spout which protrudes through an opening near the bottom of the cooler. The low position of the spout, necessitated by the reliance on gravity, makes such an arrangement inconvenient to use and susceptible to dirt contamination. The constant exposure of the spout to the exterior of the cooler further increases the possibility of contamination. Furthermore, the opening in the cooler through which the spout passes may leak water created from ice melting in the cooler compartment if the user has not properly installed the beverage dispenser. Moreover, the beverage dispenser cannot be used outside of the cooler without completely emptying the cooler and installing a separate plug to seal the opening provided in the cooler for the dispenser spout.

SUMMARY OF THE INVENTION

The present invention provides a cooler which is adapted for receiving therein a specially adapted beverage dispenser. The dispenser can be operated to dispense a beverage while the dispenser is seated within the cooler. When not in use, the dispenser can be enclosed entirely within the cooler to retain its contents in thermal isolation from the ambient conditions. The beverage dispenser can also readily be removed from the cooler and used independently of the cooler to contain and dispense beverages.

A first exemplary embodiment of a cooler in accordance with the present invention comprises one cooling compartment which is adapted to receive a beverage dispenser and to store other items in thermal isolation from the exterior. In this embodiment, the cooling compartment is accessed via one lid.

A further exemplary embodiment of a cooler in accordance with the present invention comprises two cooling compartments: one compartment for receiving a beverage dispenser and a main compartment for retaining other items. The compartment containing the beverage dispenser can thus be accessed without opening the main compartment and thereby exposing the main compartment to the ambient conditions.

Unlike known coolers, beverages can be dispensed from the beverage container without removing the container from the cooler. This avoids the problem of trying to replace the container into the cooler only to find that other items have shifted into the space previously occupied by the beverage container. As a result, the process of dispensing a drink is accelerated, reducing the amount of time that the cooler lid stays open and thus allowing the cooling compartment to stay cooler longer.

A cooler in accordance with the present invention may also preferably comprise wheels and a pull handle to facilitate transportation of the cooler. An improved cooler liner and cooler lid are also disclosed.

BRIEF DESCRIPTION OF THE DRAWING

FIGS. 4A, 4B and 4C correspond to FIGS. 3A, 3B and 3C, respectively.

DETAILED DESCRIPTION

Figure 1A:
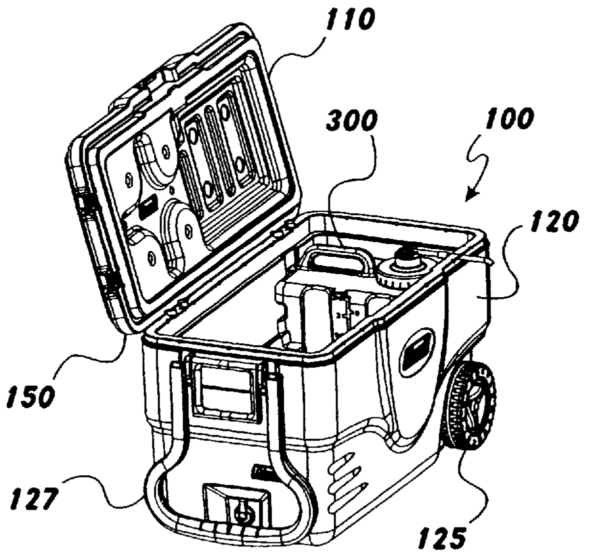
FIGS. 1A and 1B are perspective views of a first exemplary embodiment of a cooler in accordance with the present invention in assembled and disassembled states, respectively.
Figure 1B:
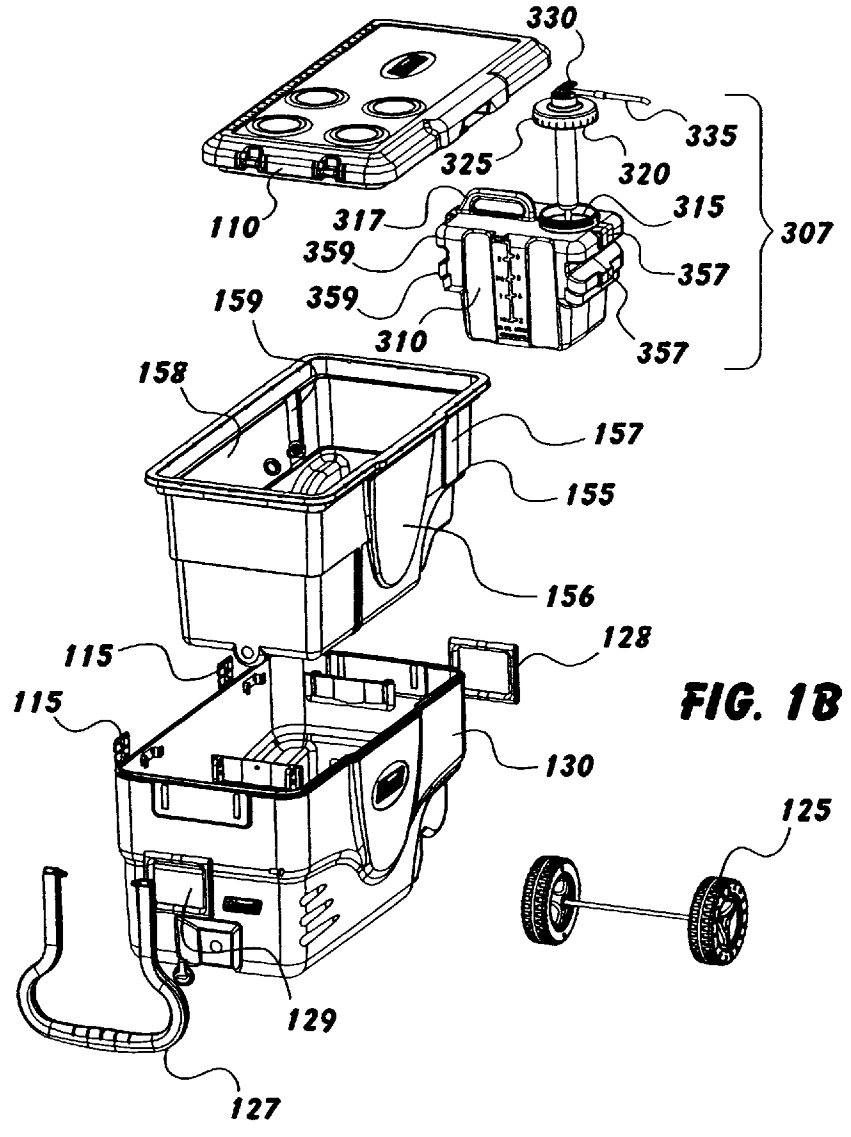

FIG. 1A shows a perspective view of an exemplary cooler 100 in accordance with the present invention. FIG. 1B shows the exemplary cooler 100 in a perspective exploded view. As shown, the cooler 100 comprises a lid 110 and a cooler body 120, with the lid 110 being pivotally attached to the body 120 such as by one or more hinges 115, or other suitable joining means. The lid 110 may alternatively be detached from the cooler body 120. The cooler 100 is generally in the shape of a rectangular solid with the cooler body 120 having a generally rectangular opening and the lid 110 having a corresponding generally rectangular shape. Of course, other shapes are possible within the scope of the present invention.

The cooler 100 comprises an interior compartment 150 for storing items to be thermally insulated from the exterior.

The compartment 150 is adapted to receive therein a beverage dispenser 300, which will be described more fully below.

The cooler 100 may optionally comprise wheels 125 arranged proximate to a bottom edge of the cooler body 120. When the cooler 100 lies flat on a flat surface, the wheels 125 preferably do not touch the flat surface (See FIGS. 8A–8C). The wheels 125 engage the surface when the cooler 100 is lifted from the end of the cooler opposite the wheels. This provides for a more stable configuration and prevents the cooler from unintentionally pivoting about the wheels should, for instance, a person sit on the cooler at the wheeled end of the cooler. To facilitate pulling the cooler 100, the cooler may also include a pull handle 127 arranged on a wall of the cooler opposite of the wheels 125. The pull handle 127 is preferably hinged on the cooler so as to swing down and out of the way when not in use. The cooler 100 may also preferably comprise lifting handles 128 and 129 arranged on opposite ends of the cooler body 120, as shown in FIG. 1B. The lifting handles 128, 129 can be implemented in a variety of known ways.

As shown in FIG. 1B, the cooler body 120 comprises a shell 130, which forms the exterior of the cooler body, and a liner 155 which is inserted into the shell 130. As with conventional cooler designs, the shape of the liner 155 generally conforms to the shape of the interior of the shell 130 while allowing a space between the liner 155 and the shell 130 for the introduction therein of an insulating material (not shown). The interior compartment 150 is delimited by the liner 155 and the lid 110.

The liner 155 is adapted for receiving the dispenser 300 therein. In the exemplary embodiment shown, the liner 155 generally has the shape of an open box, with a bottom surface and two pairs of opposing walls. The liner 155 is shown in greater detail in FIGS. 7A through 7F, described more fully below.

The dispenser 300 is adapted to fit entirely within the compartment 150 between two opposing walls 156 and 158 of the liner 155. The walls 156 and 158 have formed therein coupling features 157 and 159, respectively. The coupling features 157, 159 can be formed into the liner walls as slots, as shown in FIG. 1B. (See also FIG. 7A.) When the dispenser 300 is placed in the compartment 150, the coupling features 157 and 159 receive complementary coupling features 357 and 359, respectively, formed on the dispenser 300. In the embodiment shown, the complementary coupling features 357, 359 are formed as projections which slide within the slots 157, 159 formed in the liner 155. The engagement of the slots 157, 159 with the projections 357, 359 secure the dispenser 300 within the compartment 150, preventing lateral movement of the dispenser within the compartment while allowing the dispenser to be pulled upwards, out of the compartment.

As shown in FIGS. 1A and 1B, the dispenser 300 is preferably placed at an end of the compartment 150 proximate to the wheels 125. Such an arrangement is conducive to pulling the cooler 100 when the dispenser 300 is full and thus fairly heavy.

As shown in FIG. 1B, the dispenser 300 comprises a container 310 and a pump assembly 320. In the exemplary embodiment shown, the container 310 comprises a threaded opening 315 for receiving the pump assembly 320. The pump assembly 320 comprises a complementary threaded coupling for engaging the threaded opening of the container. Naturally, other suitable, well-known arrangements for removably coupling the pump assembly 320 to the container 310 can also be used. Preferably, the opening 315 is large enough (e.g., 4" in diameter) to allow cleaning the interior of the container 310 by hand.

To fill the dispenser 300, a user unscrews the pump assembly 320 from the container 310, thereby exposing the opening 315, and pours a liquid, such as a beverage, into the container 310. Once full, the pump assembly 320 can be reinserted and screwed onto the container 310. The liquid in the container 310 can then be dispensed by operating the pump of the pump assembly 320.

Figure 3C:
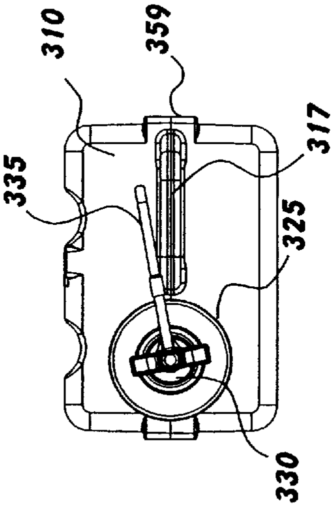
FIGS. 3A, 3B and 3C are top views of an exemplary embodiment of a beverage dispenser in accordance with the present invention.
Figure 3B:
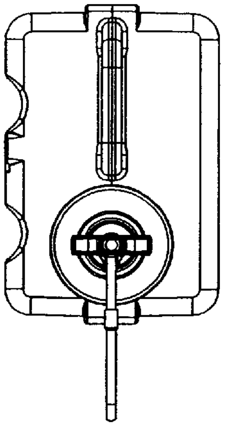
Figure 3A:
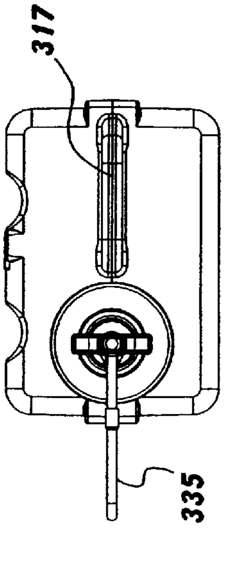
Figure 4C:
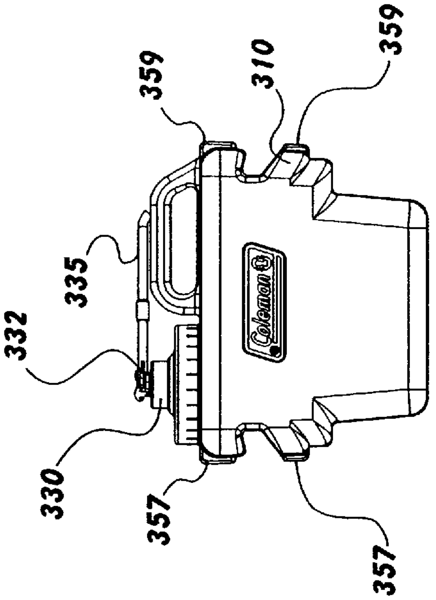
FIGS. 4A, 4B and 4C are side views of an exemplary embodiment of a beverage dispenser in accordance with the present invention.
Figure 4B:
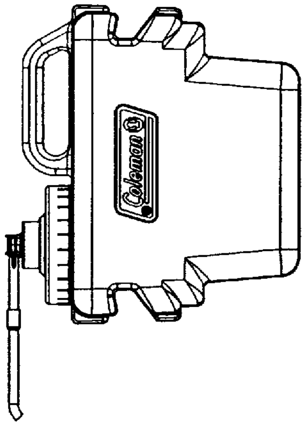
Figure 4A:
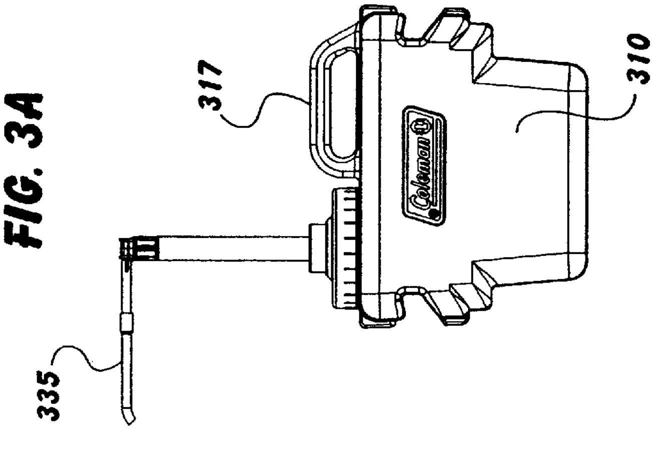

FIGS. 3A through 3B and 4A through 4C illustrate the operation of the dispenser 300. The pump assembly 320 comprises a pump 330 which comprises a plunger 332 with a spout 335 attached thereto. The pump 330 operates in a conventional manner to dispense the liquid contents of the dispenser 300 via the spout 335 by raising and depressing the plunger 332. When the plunger 332 is raised, the pump 330 draws liquid from the container 310. When the plunger 332 is depressed, the liquid drawn by the pump 330 is expelled from the spout 335. Preferably, as shown in FIGS. 3 and 4, the plunger 332 can swivel about its axis between at least a first and second position. In the first position, shown in FIG. 3C, the lid 110 can be closed over the beverage dispenser 300. In the second position, shown in FIGS. 3A and 3B, the spout 335 can dispense liquid over a side of the cooler 100 when the dispenser is in the cooler, as shown in FIG. 1A. Of course, the pump can also be operated with the dispenser 300 removed from the cooler 100.

The amount of liquid dispensed by depressing the plunger 332 once is a function of how high the plunger is pulled up, and thus of how much liquid is drawn by the pump 330 in the upward stroke. In a further exemplary embodiment, the plunger 332 may include graduated markings which indicate the volume of liquid to be dispensed when the plunger 332 is depressed from a particular level. In an exemplary embodiment, the pump 330 will dispense 4 fluid ounces of liquid for one full stroke of the plunger 332.

Figure 5:
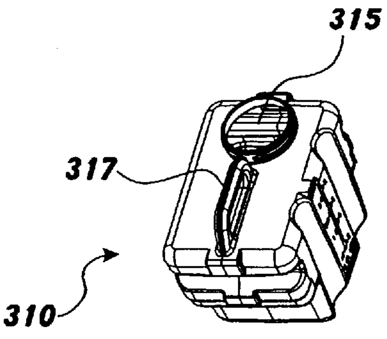
FIG. 5 is a perspective view of an exemplary embodiment of a container component of the exemplary beverage dispenser of FIGS. 3 and 4.

FIG. 5 shows a perspective view of the container 310, while FIGS. 6A, 6B, 6C, 6D and 6E show top, front, bottom, side and rear views, respectively, of the container. As shown in FIG. 5, the container 310 preferably comprises a handle 317 for lifting and carrying the dispenser 300. The dispenser 300 can also be carried with two hands using finger handle reliefs 318 formed on opposite ends of the container 310. The container 310 may include graduated markings on one or more side to indicate the level of liquid therein.

Figure 2A:
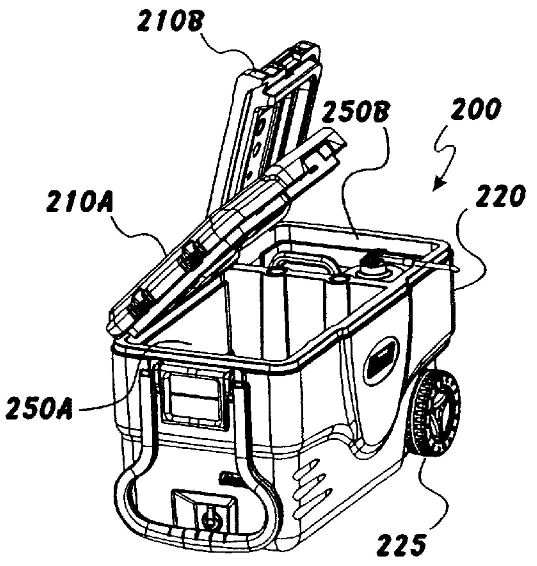
FIGS. 2A and 2B are perspective views of a further exemplary embodiment of a cooler in accordance with the present invention in assembled and disassembled states, respectively.
Figure 2B:
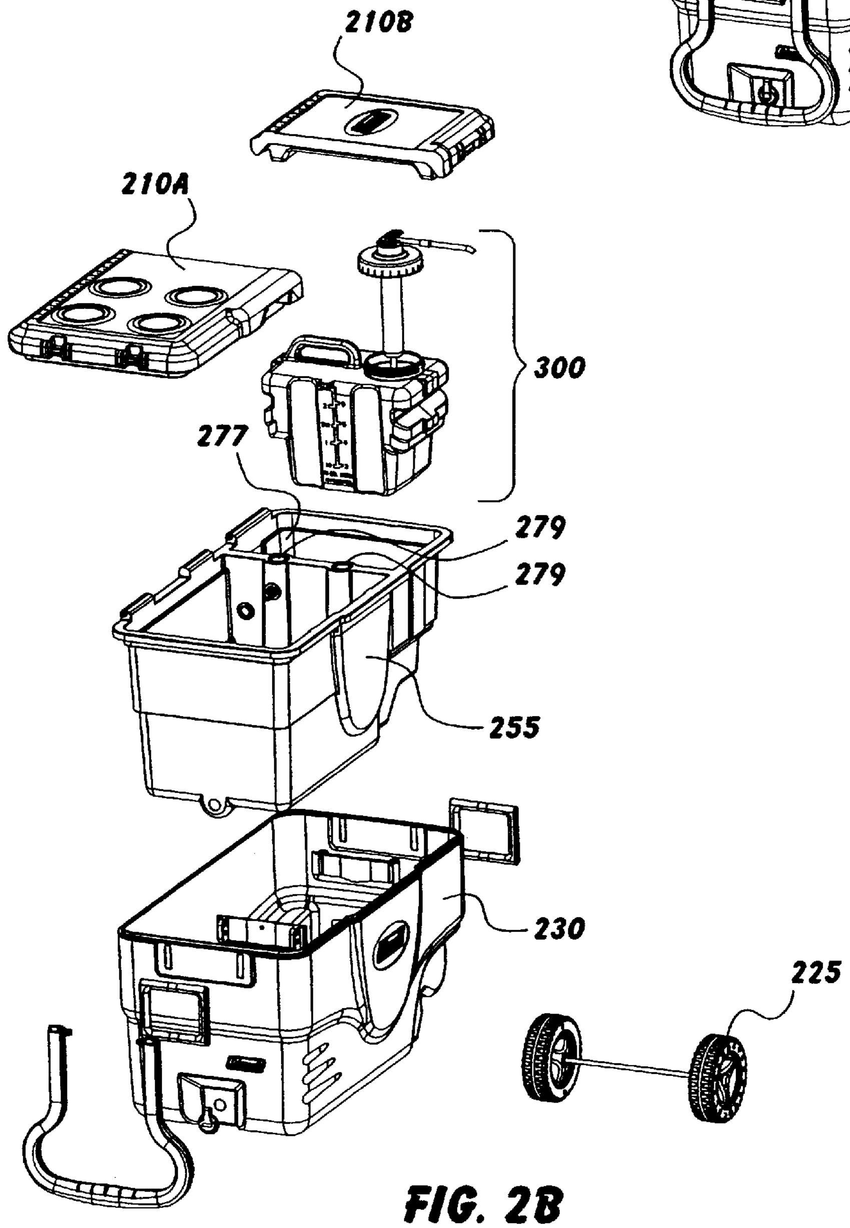

FIG. 2A shows a perspective view of a further exemplary embodiment of a cooler 200 in accordance with the present invention. FIG. 2B shows the exemplary cooler 200 in a perspective exploded view. As shown, the cooler 200 comprises two lids 210A and 210B and a cooler body 220, with the lids 210A and 210B being pivotally attached to the body 220 such as by hinges, or other suitable joining means.

In this embodiment, the cooler 200 comprises two interior compartments 250A and 250B. Compartment 250A is used for storing items to be thermally insulated from the exterior. Compartment 250B is used for receiving a beverage dispenser in accordance with the present invention, such as the beverage dispenser 300 described above. Each of the compartments 250A and 250B has a corresponding lid 210A and 210B, respectively, thereby allowing the compartments 250A and 250B to be accessed independently via the lids 210A and 210B, respectively. Thus, for example, the dispenser 300 can be accessed to dispense a beverage while keeping the compartment 250A closed and thus thermally isolated from the exterior of the cooler 200.

Figure 6A:
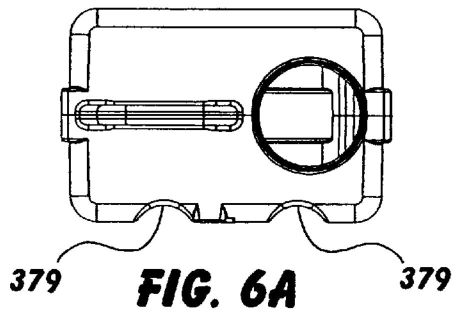
FIGS. 6A through 6E are various views of the exemplary container component of FIG. 5.
Figure 6B:
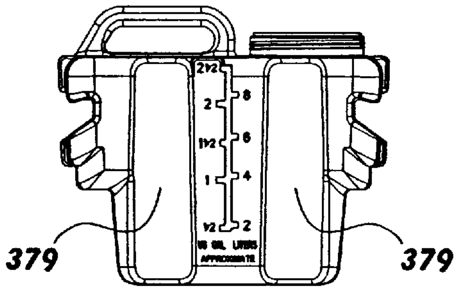
Figure 6C:
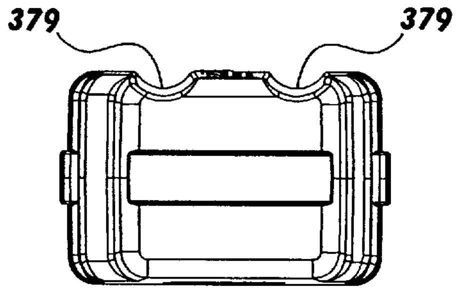
Figure 6E:
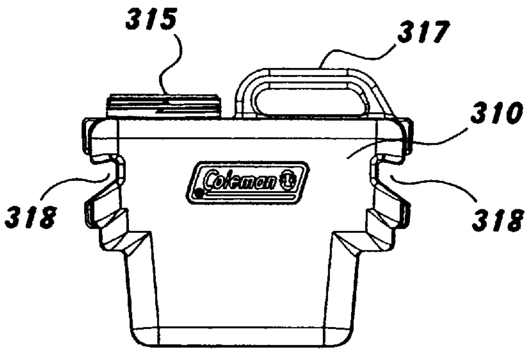
Figure 6D:
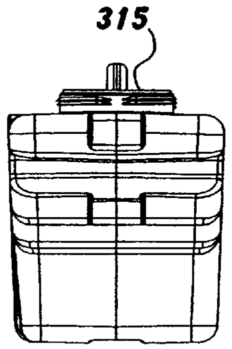

As with the embodiment of FIGS. 1A and 1B, the cooler 200 comprises a cooler body 220. The body 220 comprises an exterior shell 230 and a liner 255 arranged in the shell. In this embodiment, the liner 255 is formed with a partition 277 which separates the interior compartments 250A and 250B. The partition 277 may include one or more posts 279 which may be necessitated by a molding process used to form the liner. The posts 279 also impart rigidity to the partition 277 and may also provide a keying function in placing the dispenser 300 in the compartment 250B. As shown in FIGS. 6B and 6C, the container 310 of the dispenser 300 may be provided with indentations 379 which complement the posts 279 on the partition 277. The posts 279 and indentations 379 thus allow the dispenser to be placed in the compartment 250B with only one orientation.

In all other material respects, the construction of the cooler 200 is substantially similar to that of the cooler 100, described above.

A cooler in accordance with the present invention can be manufactured using well-known techniques and materials such as plastics.

Figure 7A:
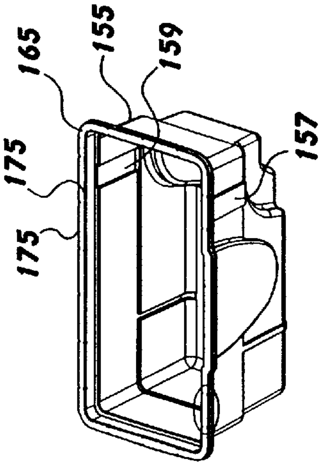
FIGS. 7A through 7F are various views of a liner for an exemplary embodiment of a cooler in accordance with the present invention.
Figure 7D:
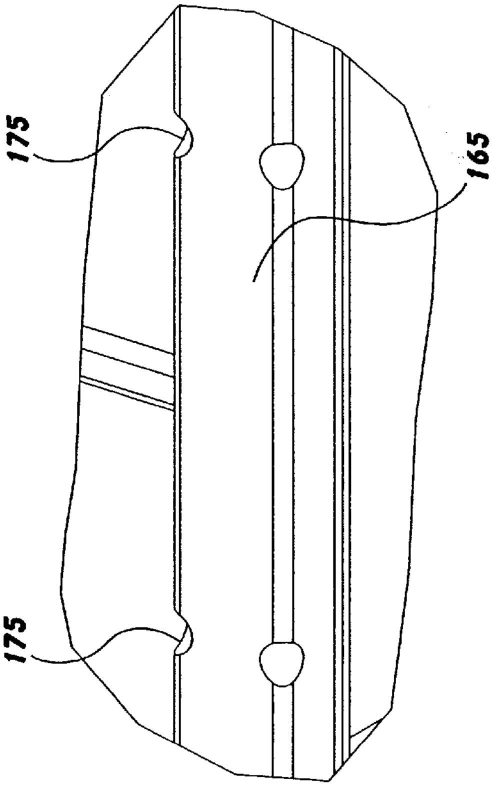

FIG. 7A shows a perspective view of the liner 155 as used in the exemplary single-compartment cooler 100 described above. FIG. 7B is a side view of the liner 155 and FIG. 7C is a cross-sectional view. As shown, the liner 155 comprises an integral lip 165 which surrounds the perimeter of the liner opening. The lip 165 provides rigidity to the liner and provides a surface for mating the liner to the shell 130 of the cooler body. FIG. 7D shows a detailed perspective view of a portion of the lip 165.

Figure 7F:
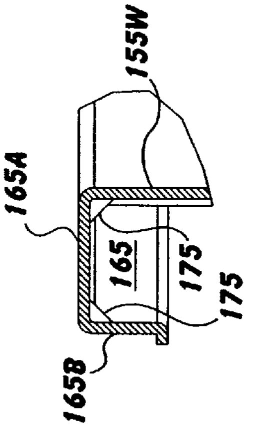
Figure 7C:
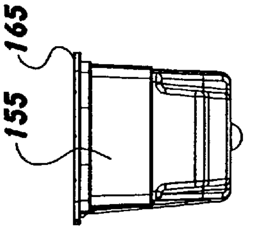
Figure 7E:
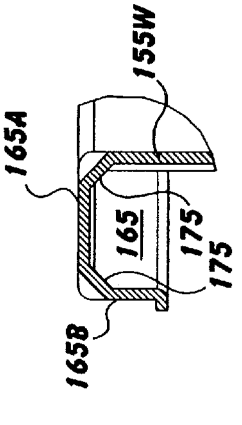
Figure 7B:
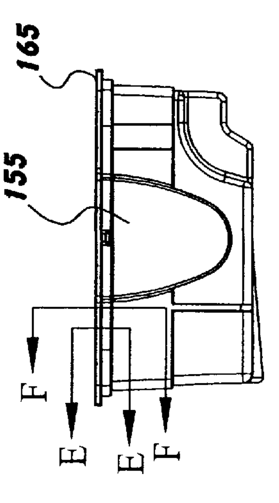
Figure 9A:
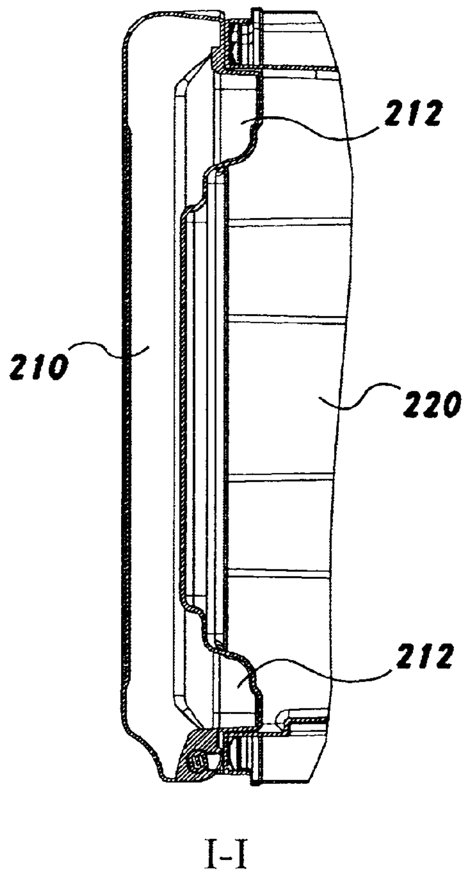
FIGS. 9A through 9C are cross-sectional views corresponding to FIGS. 8A through 8C, respectively.

As shown in cross section in FIGS. 7E and 7F, the lip 165 comprises a horizontal surface 165*a* and a vertical surface 165*b* which are substantially mutually perpendicular. The horizontal surface 165*a* is substantially perpendicular to the side walls 155*w* of the liner. In accordance with the present invention, the lip 165 is provided with stiffening features 175 arranged along the two edges defined by the surfaces 165*a*, 165*b* and 155*w*. As shown, the stiffening features 175 can be formed as indentations arranged at an angle (e.g., 45 degrees) to the adjoining surfaces. The stiffening features 175 serve to maintain the intended angular relationship between the surfaces adjoining the edges into which the features are formed. The stiffening features 175 are molded into the edges integrally with the lip 165. The features 175 allow the use of softer, more flexible and thus less expensive plastic which may otherwise tend to lose its shape after being molded. Although shown with respect to the one-compartment liner 155, the stiffening features 175 can also be used with the two-compartment liner 255 or conventional liners.

Figure 8A:
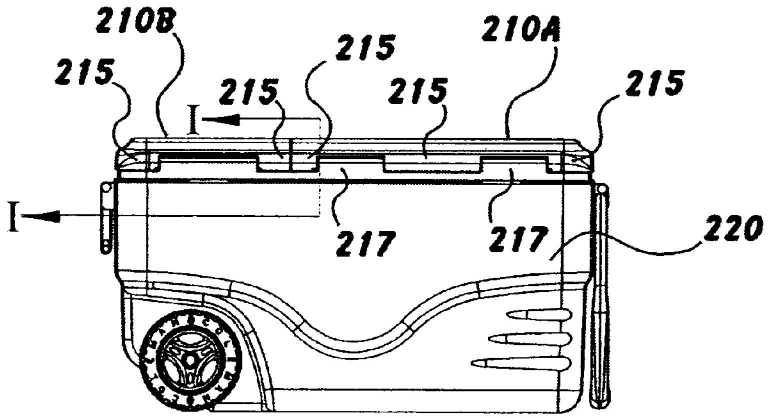
FIGS. 8A through 8C are views of the back of the further exemplary embodiment of a cooler in accordance with the present invention with the lid in various positions.
Figure 9B:
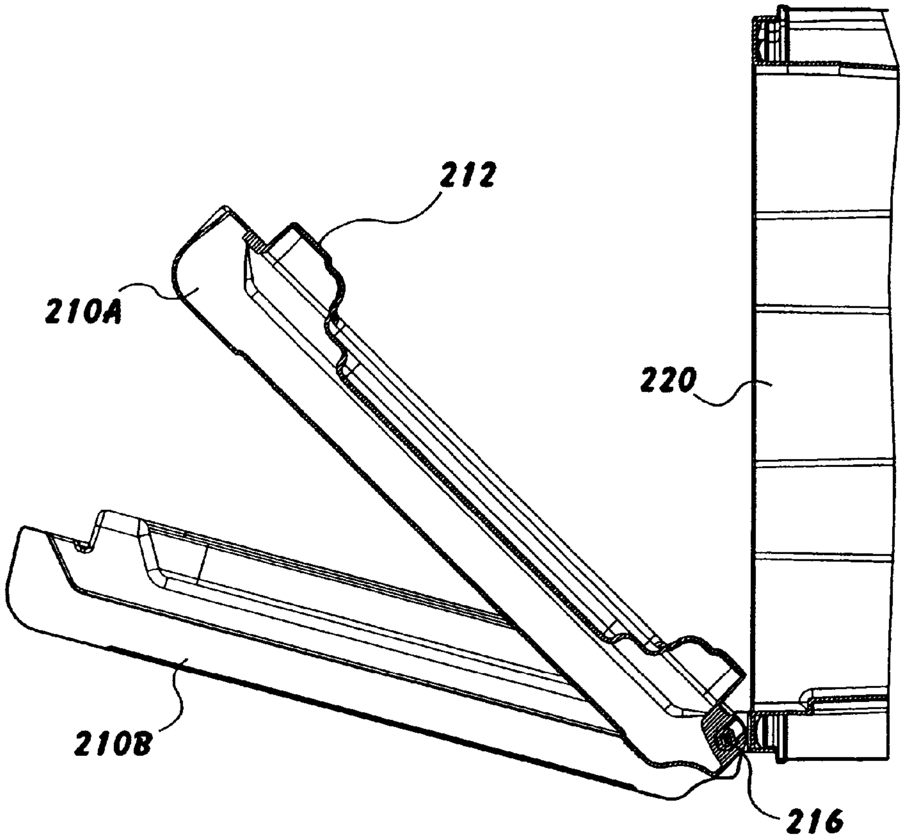
Figure 8B:
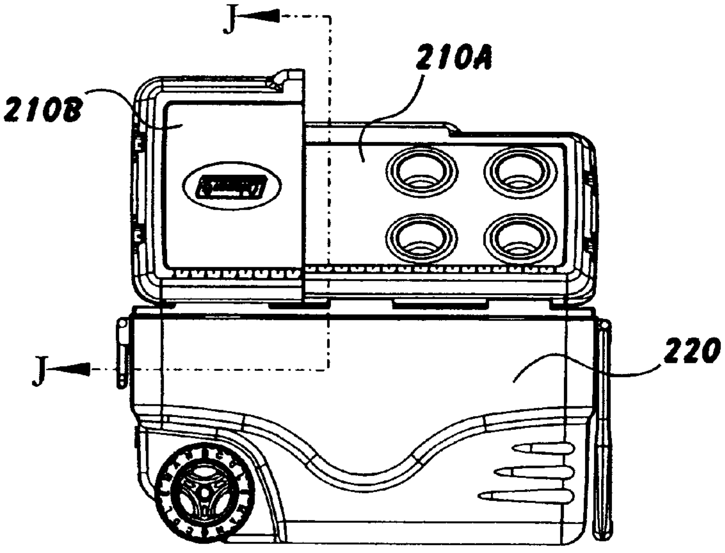
Figure 9D:
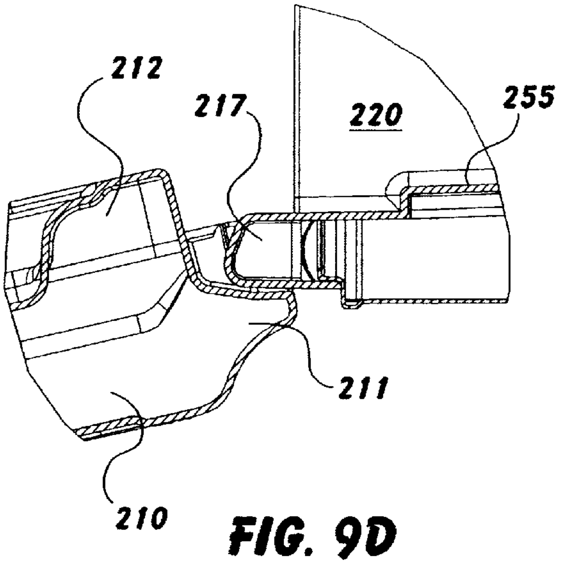
FIG. 9D is a detailed view of a portion of FIG. 9C.
Figure 9C:
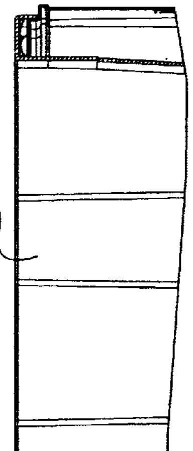
Figure 9C:
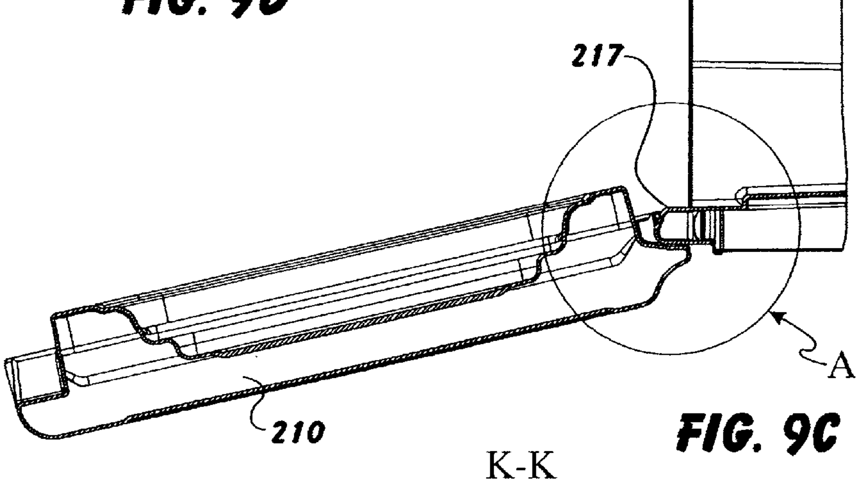
Figure 8C:
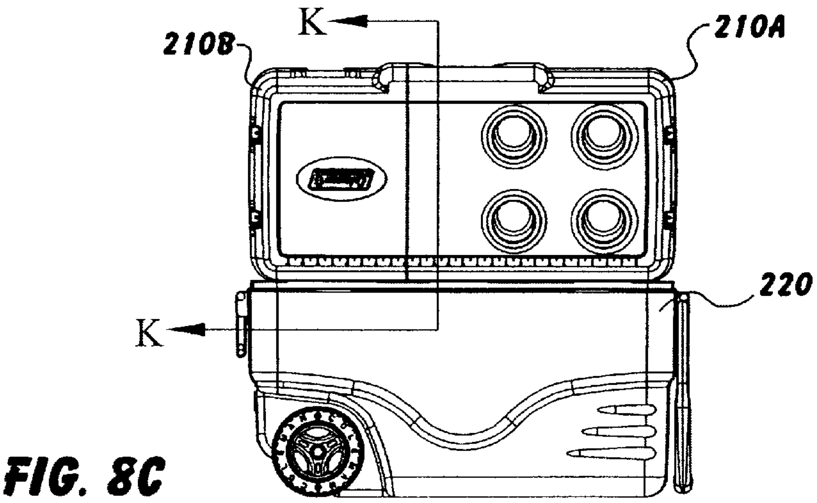

FIGS. 8A through 8C and 9A through 9D illustrate an exemplary embodiment of a hinge for attaching the lid 210 to the cooler body 200. As shown in FIG. 8A, the lid parts 210A and 210B each comprise two or more hinge projections 215 which engage complementary hinge projections 217 on the body 220. Each projection 217 comprises an integral pin 216 which is received in a complementary pocket in the hinge projections 215. As shown, the lid 210 comprises a ridge 211 adjacent to the hinge line which abuts the hinge projections 217 on the cooler body when the lid is fully opened, as shown in FIGS. 9C and 9D. The abutment of the ridge 211 against the projections 217 prevents the lid from opening further. As shown in FIG. 9C, in the fully open position, the angle defined by the top of the cooler body 220 and the lid 210 is preferably greater than 90 degrees so that the lid will stay open by itself in the fully opened position.

Although shown with respect to the split-compartment embodiment of FIGS. 2A and 2B, such a hinge may be used in a wide variety of coolers and other similar devices.

The lids 110 and 210 of the exemplary coolers described above may also include attachment features 117, as shown in FIGS. 10A through 10E. The attachment features may be used for attaching bungee cords, for example, to the lid. The provision of bungee cords on the lid makes it possible to temporarily secure items to the top of the cooler. One or more attachment points 117 are preferably arranged along opposing edges of the lid 110. As shown, two attachment points 117 are arranged on the far ends of the lid. The attachment points 117 may be formed as openings, as shown in the cross-sectional view of FIG. 10E. A bungee cord can be passed through the opening and held in place such as by being knotted at one end. As shown, the attachment features 117 are preferably integrated into the edge of the lid.

Figure 10A:
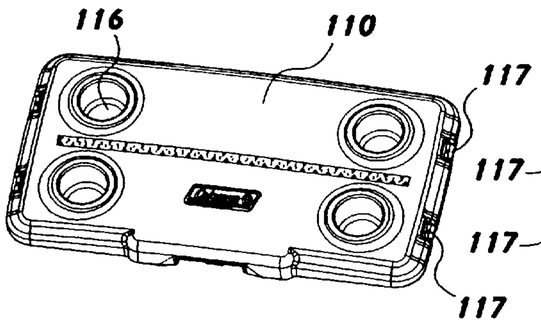
FIGS. 10A through 10E show various views of a lid for the first exemplary embodiment of a cooler in accordance with the present invention.

As shown in FIG. 10A, in an exemplary embodiment, the lid 110 (or 210) comprises one or more cup holders 116. In the exemplary embodiment, the cup holders 116 have a depth of approximately 2". The depth of the holders will depend on the thickness of the lid. Moreover, a clearance between the bottom surface of the lid and the bottom of each cup holder should be maintained so as to allow for insulation, such as urethane foam, in the lid to completely surround the cup holder for cold retention properties. The distances of the cup holders from the cooler lid perimeter, the distances of the cup holders from each other and the clearance between the bottom surface of the lid and the cup holder protrusions into the lid cavity are selected so as to provide an achievable blow molding draw ratio depth. In accordance with the present invention, the cup holders 116 can be formed in the lid even though the lid is manufactured using blow molding techniques.

Figure 10B:
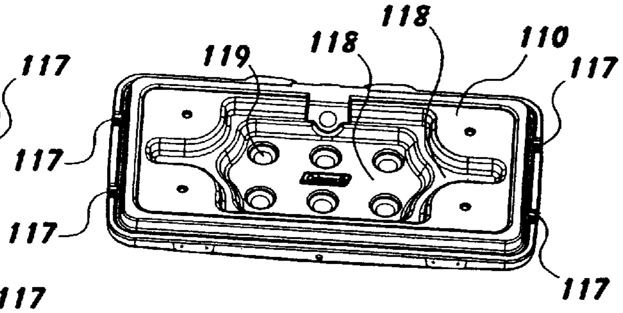
Figure 10C:
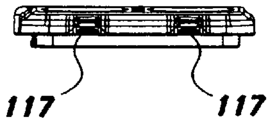
Figure 10D:
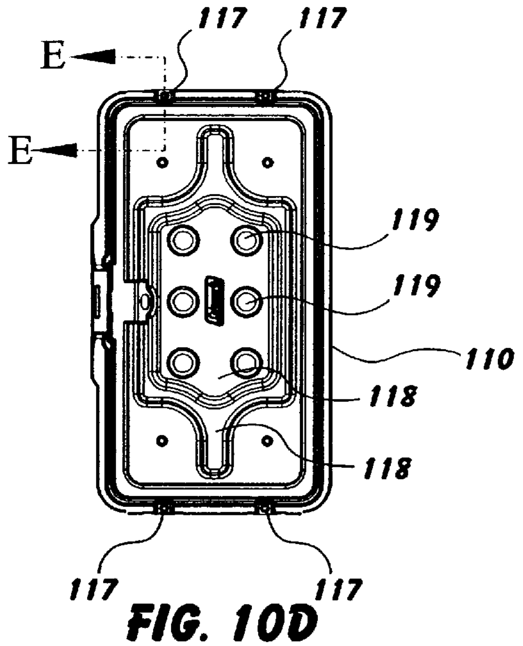
Figure 10E:
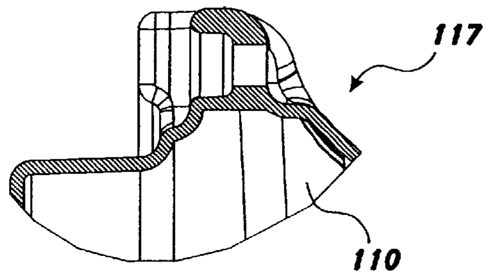

Also, as shown in FIGS. 10B and 10D, the underside of the lid 110 is advantageously provided with indented areas 118 for maximizing the useful interior volume of the compartment 150 when the lid is closed. Further indentations 119 within the indented areas 118 can be provided for accommodating tall items such as bottles. To assist in placing such items beneath the indentations 119, locator marks, such as dimples or mounds or other suitable markings, can be formed in or placed on the liner 155 directly beneath the indentations 119.

What is claimed is:

1. A cooler comprising:

a lid;

a cooler body, the cooler body comprising an interior compartment selectively closeable by the lid, the interior compartment being thermally isolated when closed; and a liquid dispenser, the liquid dispenser being removably retained within and fitted to the interior compartment and including:

a container for holding a liquid and having a top opening, and a dispensing device for dispensing the liquid from the container through the top opening while the liquid dispenser is in an upright position;

wherein the lid and the interior compartment enclose the liquid dispenser while the liquid dispenser is within the interior compartment and the lid is in a closed position.

2. The cooler of claim 1, wherein the cooler body comprises a further interior compartment, the further interior compartment being selectively closeable by a further lid.

3. The cooler of claim 1, wherein the dispensing device includes a pump.

4. The cooler of claim 1, wherein the cooler body includes a first coupling feature and the liquid dispenser includes a second coupling features and wherein the first and second coupling features mate together to retain the liquid dispenser within the interior compartment.

5. The cooler of claim 4, wherein the first coupling feature includes a slot and the second coupling feature includes a projection.

6. The cooler of claim 3, wherein the pump includes a rotatable spout that can be rotated over a side of the cooler body.

7. The cooler of claim 1, wherein the cooler body comprises an outer shell and a liner, the liner being arranged within the outer shell and being adapted to removably receive the liquid dispenser.

8. The cooler of claim 7, wherein the liner comprises at least one stiffening feature arranged on an edge of the liner.

9. The cooler of claim 7, wherein the lid comprises on indentation on a bottom surface of the lid and the liner comprises a locator mark which is located directly beneath the indentation when the lid is closed.

10. The cooler of claim 1, wherein the cooler body comprises one or more wheels arranged proximate to a lower edge of the cooler body and wherein the liquid dispenser is arranged at an end of the interior compartment proximate to the one or more wheels.

11. The cooler of claim 10, wherein a bottom of the cooler body is below a lowest point of each of the wheels.

12. The cooler of claim 10, wherein the cooler body comprises a pull handle arranged on a side of the cooler body opposite of the one or more wheels.

13. The cooler of claim 1, wherein the lid comprises a plurality of attachment points.

14. The cooler of claim 1, wherein the lid is pivotally attached to the cooler body by an integral hinge and wherein an opening angle of the lid is limited by the integral hinge.

15. The cooler of claim 1, wherein the lid comprises at least one cup holder, the at least one cup holder having a depth of at least one inch.

16. A cooler comprising:

a lid;

a cooler body, the cooler body comprising an interior compartment selectively closeable by the lid, the interior compartment being thermally isolated when closed; and a liquid dispenser, the liquid dispenser being removably retained within the interior compartment and including:

a container for holding a liquid, and a dispensing device fully encloseable beneath said lid for dispensing the liquid from the container;

wherein the cooler body includes a first coupling feature and the liquid dispenser includes a second coupling feature and wherein the first and second coupling features mate together to retain the liquid dispenser within the interior compartment.

17. The cooler of claim 16, wherein the cooler body comprises a further interior compartment, the further interior compartment being selectively closeable by a further lid.

18. The cooler of claim 16, wherein the dispensing device includes a pump.

19. The cooler of claim 16, wherein the lid comprises at least one cup holder, the at least one cup holder having a depth of a least one inch.

20. The cooler of claim 16, wherein the first coupling feature includes a slot and the second coupling feature includes a projection.

21. The cooler of claim 18, wherein the pump includes a rotatable spout that can be rotated over a side of the cooler body.

22. The cooler of claim 16, wherein the cooler body comprises an outer shell and a liner, the liner being arranged within the outer shell and being adapted to removably receive the liquid dispenser.

23. The cooler of claim 22, wherein the liner comprises at least one stiffening feature arranged on an edge of the liner.

24. The cooler of claim 22, wherein the lid comprises on indentation on a bottom surface of the lid and the liner comprises a locator mark which is located directly beneath the indentation when the lid is closed.

25. The cooler of claim 16, wherein the cooler body comprises one or more wheels arranged proximate to a lower edge of the cooler body and wherein the liquid dispenser is arranged at an end of the interior compartment proximate to the one or more wheels.

26. The cooler of claim 25, wherein a bottom of the cooler body is below a lowest point of each of the wheels.

27. The cooler of claim 25, wherein the cooler body comprises a pull handle arranged on a side of the cooler body opposite of the one or more wheels.

28. The cooler of claim 16, wherein the lid is pivotally attached to the cooler body by an integral hinge and wherein an opening angle of the lid is limited by the integral hinge.

* * * * *